M. DRANE AND H. W. STONE.
PETCOCK OPERATING DEVICE.
APPLICATION FILED DEC. 19, 1919.

1,355,544.                                  Patented Oct. 12, 1920.

Inventors:
Merritt Drane
Harry W. Stone
By Max A. Schmidt
Attorney.

UNITED STATES PATENT OFFICE.

MERRITT DRANE AND HARRY W. STONE, OF LOUISVILLE, KENTUCKY.

PETCOCK-OPERATING DEVICE.

1,355,544.  Specification of Letters Patent.  Patented Oct. 12, 1920.

Application filed December 19, 1919. Serial No. 346,051.

*To all whom it may concern:*

Be it known that we, MERRITT DRANE and HARRY W. STONE, citizens of the United States, residing at Louisville, in the county of Jefferson and State of Kentucky, have invented certain new and useful Improvements in Petcock-Operating Devices, of which the following is a specification.

This invention relates to devices for opening pet cocks which are not readily accessible. The present device has been designed more particularly for operating the radiator drain cock of a Ford motor car, as the same is situated under the radiator in such a position that it is extremely awkward to get at to let the water out of the radiator.

The invention has for its object to provide a simple, efficient and easily applied device of the kind stated, and to this end it consists in a novel combination and arrangement of parts to be hereinafter described and claimed.

In order that the invention may be better understood, reference is had to the accompanying drawing forming a part of this specification, and in said drawing—

Figure 1:
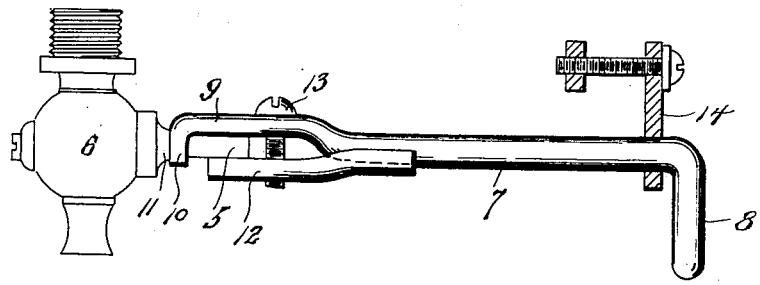
Figure 2:
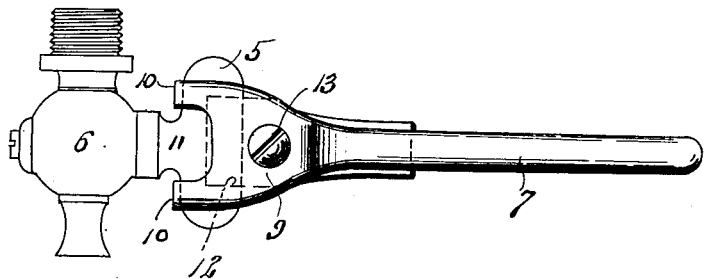

Figure 1 is an elevation of the device in place, and Fig. 2 is a plan view of the device.

The preferred embodiment of the invention has been shown, but it is to be understood that various changes and modifications may be made without a departure from the spirit and scope of the invention as claimed hereinafter.

Referring specifically to the drawing, 5 denotes the flat wing-like handle of a pet cock, the body of which latter is shown at 6. The device for opening and closing the pet cock is a rod 7 having at one end an operating handle 8, and provided at its other end with jaws for attachment to the handle 5. Two opposite jaw members are provided, one of these being formed by a flat terminal portion 9 of the rod, said part 9 having two laterally spaced inturned hooks 10 at its extremity. Thus, the part 9 can be seated against one side of the handle 5, with the hooks 10 straddling the stem 11 of the latter, and coming behind the two outstanding wings forming the handle 5. The other side of the handle is engaged by a jaw member 12 in the form of a flat plate which is secured to the part 9 by a screw 13. Thus, when the screw 13 is tightened up, the handle 5 is securely clamped between the jaw members 9 and 12, and the hooks 10 prevent said members from being pulled off the handle. The pet cock can now be easily opened or closed by means of the handle 8 on the rod 7, without reaching under the radiator.

The rod 7 is of suitable length so that its handle 8 may come to any convenient position for operation. Fig. 1 shows a support 14 for the outer end of the rod 7, said support being secured to any convenient portion of the car.

We claim;

A device for operating the handle of pet cocks, comprising a rod having a flat jaw member at one end and a handle at the other end, said jaw member having laterally spaced inturned hooks at its extremity to straddle the shank of the pet cock handle, a flat jaw member opposite the first-mentioned jaw member back of the aforesaid hooks, and a clamping member connecting the jaw members.

In testimony whereof we affix our signatures.

MERRITT DRANE.
HARRY W. STONE.